M. Likes. Gang Plow.

PATENTED JUN 27 1871

116332

Witnesses:
P. C. Dieterich.
Wm H. C. Smith.

Inventor:
M. Likes.
PER Munn & Co
Attorneys.

AM. PHOTO-LITHOGRAPHIC CO. N.Y. (OSBORNE'S PROCESS.)

UNITED STATES PATENT OFFICE.

MICHAEL LIKES, OF MANSFIELD, OHIO.

IMPROVEMENT IN GANG-PLOWS.

Specification forming part of Letters Patent No. 116,332, dated June 27, 1871.

*To all whom it may concern:*

Be it known that I, MICHAEL LIKES, of Mansfield, in the county of Richland and State of Ohio, have invented a new and useful Improvement in Gang-Plow; and I do hereby declare that the following is a full, clear, and exact description thereof, which will enable others skilled in the art to make and use the same, reference being had to the accompanying drawing forming part of this specification, in which—

Figure 1:
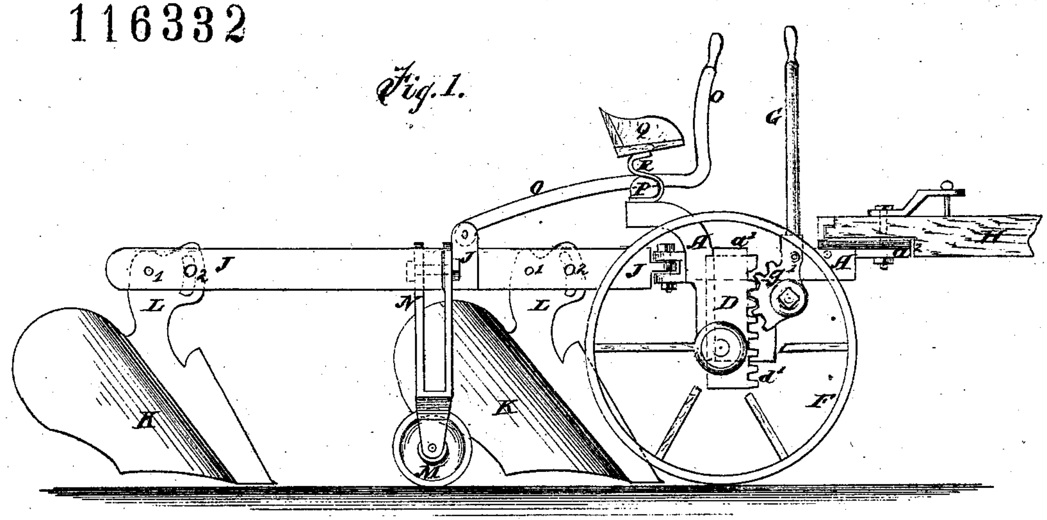
Figure 2:
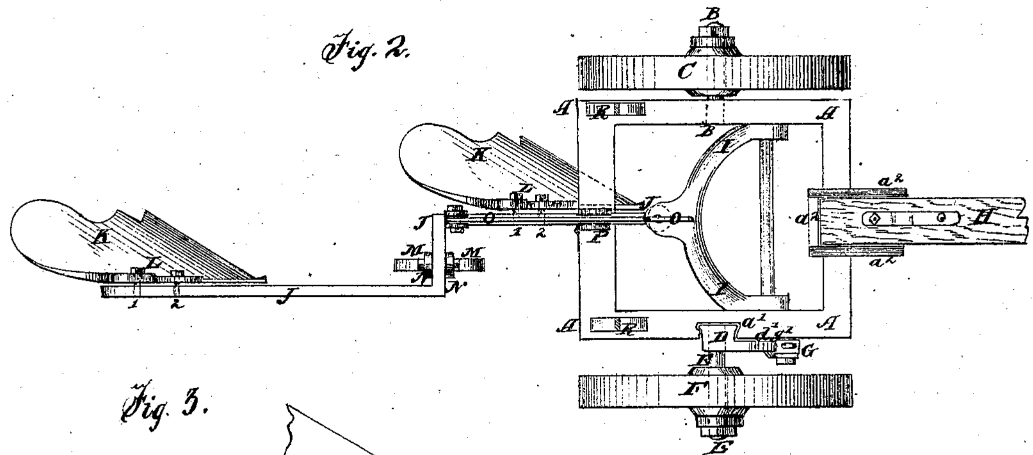
Figure 3:
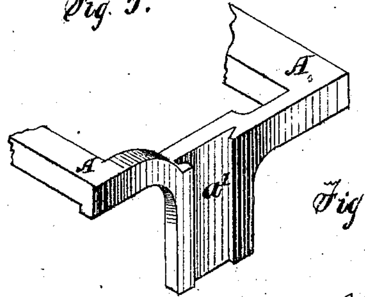
Figure 4:
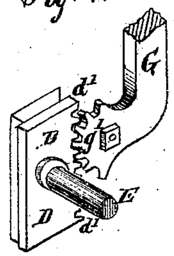

Figure 1 is a side view of my improved machine, part of the wheel being broken away to show the construction. Fig. 2 is a top view of the same, the seat being removed. Fig. 3 is a detail perspective view of the right-hand side of the frame. Fig. 4 is a detail perspective view of the device for raising and lowering the right hand or furrow-wheel.

Similar letters of reference indicate corresponding parts.

My invention has for its object to furnish an improved gang-plow, simple in construction, easily manipulated, convenient in use, and effective in operation; and it consists in the construction and combination of the various parts, as hereinafter more fully described.

A is the frame of the machine, upon the left-hand side bar of which is formed a downwardly-projecting arm, plate, or block, to which is attached the axle B, upon which the left-hand wheel C works. In the middle part of the right-hand side bar of the frame A is formed a dovetailed groove, $a^1$, in which is placed a dovetailed block, D, to the lower part of which is attached the axle E, upon which the wheel F works. Upon the forward edge of the block D are formed cogs or teeth $d'$, which mesh into the teeth of the segmental gear-wheel $g'$ formed upon the lower end of the lever G, which is pivoted to the side of the frame A, the pivoting bolt passing through the center of the segmental gear-wheel $g'$. By this construction, by operating the lever G the wheel F may be raised and lowered, as may be required, to keep the machine level under various circumstances—as, for instance, when running upon the surface of the ground, or when working upon a side hill or upon level ground. The lever G is secured in any position, into which it may be adjusted by a pin passing through a hole in the said lever and into one of the set of holes formed for its reception on the side of the frame A. To the central part of the front cross-bar of the frame A is attached or upon it is formed a socket, $a^2$, to receive the rear end of the tongue H, and to which the said tongue is secured by a bolt, as shown in Figs. 1 and 2. I is a curved cross-bar fitting in between the side bars of the frame A, to which frame its ends are pivoted by a bolt, bolts, or rivets, as shown in Fig. 2. Upon the rear side of the middle part of the curved bar I are formed two lugs, placed one directly above the other, a space being left between them to receive the forward end of the plow-beam J, where it is pivoted in place by a pin or bolt passing through a hole in the said lugs and through a hole in the end of the said beam. By this construction the rear end of the plow-beam has a free lateral and vertical movement. K are the plows, the upper ends of the standards L of which are secured to the plow-beam J by bolts 1 2, the bolt 1 passing through a hole in the plow-beam J and a hole in the upper end of the standard L, and the bolt 2 passing through a hole in the plow-beam J and through a curved slot in a lug or projection formed upon the forward side of the upper end of the standard L, so that the points of the plows may be raised or lowered, as may be desired. The beam J is made with an offset, or is bent twice at right angles between the two plows K, said offset being made of such a length as to bring the plows to a proper distance apart. M is a gauge-wheel which is pivoted in a slot in the lower end of the standard N. The standard N is slotted from its upper end nearly to the wheel M to receive the offset of the beams J, so that it may be slipped up and down upon said beam to gauge the depth at which the plows are to work in the ground and to support the plows free from the ground when passing from place to place. The standard N is secured in place upon the beam J when adjusted by a bolt passing through a hole in the said beam and through a longitudinal slot in the standard N. To the plow-beam J, at or near its offset, is pivoted the rear end of the lever O, which passes through a slot in the upper end or head of the bolt P, which is swiveled to the rear cross-bar of the frame A, so that the said lever may turn with the lateral movements of the plow-beam. The forward part of the lever O is bent upward to bring it into a position to be conveniently operated by the driver from his seat Q to raise the plows away from the ground when desired for passing obstructions or for other purposes. The seat Q is supported upon springs R, which are attached to the rear part of the frame A. The rear part of the side bars of the frame A may be curved upward to raise the rear cross-bar of the frame A to a suitable height to support the lever O and seat Q.

Having thus described my invention, I do not desire to claim the devices, *per se*, which compose my improved plow; but

I claim as new and desire to secure by Letters Patent—

An improved gang-plow, formed by the arrangement of the frame A $a^1$ $a^2$, wheels C F, dovetailed block D $d'$, lever G $g'$, tongue H, pivoted bar I, plow-beam J, plows K, standards L, gauge-wheel M, slotted standard N, lever O, swiveled bolt P, and seat Q with each other, said parts being constructed and operating substantially as herein shown and described, and for the purposes set forth.

MICHAEL LIKES.

Witnesses:
T. E. BARROWS,
JAS. S. CRALL.